United States Patent
Chen et al.

(10) Patent No.: US 8,203,400 B2
(45) Date of Patent: Jun. 19, 2012

(54) BROADBAND FILTER

(75) Inventors: He-Ping Chen, Shenzhen (CN);
Kuo-Wei Hung, Taipei Hsien (TW);
Hong-Hao Kang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 606 days.

(21) Appl. No.: 12/411,407

(22) Filed: Mar. 26, 2009

(65) Prior Publication Data

US 2009/0278625 A1    Nov. 12, 2009

(30) Foreign Application Priority Data

May 8, 2008   (CN) .......................... 2008 1 0301469

(51) Int. Cl.
*H03H 7/00* (2006.01)
*H02M 1/12* (2006.01)

(52) U.S. Cl. ........................................ 333/181; 333/167

(58) Field of Classification Search .................. 333/181, 333/167, 174, 184, 185, 168, 177, 12
See application file for complete search history.

(56) References Cited

U.S. PATENT DOCUMENTS

| | | | |
|---|---|---|---|
| 4,342,013 A | 7/1982 | Kallman | |
| 4,723,115 A | 2/1988 | Apter | |
| 4,761,623 A | 8/1988 | Schneider | |
| 5,179,362 A | 1/1993 | Okochi et al. | |
| 5,483,136 A * | 1/1996 | Marcinkiewicz | 318/558 |
| 5,969,583 A | 10/1999 | Hutchison | |
| 7,453,330 B2 * | 11/2008 | Beil et al. | 333/181 |
| 2006/0056207 A1 | 3/2006 | Sarlioglu | |

* cited by examiner

*Primary Examiner* — Seungsook Ham
(74) *Attorney, Agent, or Firm* — Altis Law Group, Inc.

(57) ABSTRACT

A broadband filter filtering noise over a first conductive wire, a second conductive wire, and a third conductive wire includes a differential-mode filtering circuit connected to both the first conductive wire and the second conductive wire and a common-mode filtering circuit connected to both the first conductive wire and the second conductive wire. The differential-mode filtering circuit includes two inductors and two capacitors for filtering differential-mode noise of different frequencies. The common-mode filtering circuit includes two inductors and six capacitors filtering common-mode noise of different frequencies.

8 Claims, 3 Drawing Sheets

BROADBAND FILTER

BACKGROUND

1. Technical Field

The disclosure relates to broadband filters.

2. Description of Related Art

Three-phase AC powers are frequently used in manufacturing and conducting applications due to their favorable power generation, electrical distribution, and electrical to mechanical energy conversion characteristics. However, when three-phase AC powers are powered on/off, noise may be generated and transmitted to conductive wires, resulting in interference with other devices, usually loads, connected thereto. Such noise often includes differential-mode noise generated between live wires and neutral wires and common-mode noise generated between live wires and ground wires and between neutral wires and ground wires. Thus, there is a need for filters between the three-phase AC powers and loads for suppressing noise.

FIG. 1 is a circuit diagram of a filter 10 including a live wire L, a neutral wire N, a ground wire G, a differential-mode filtering circuit 101, and a common-mode filtering circuit 102. The differential-mode filtering circuit 101 includes inductors L1' and L2' and a capacitor C1'. The common-mode filtering circuit 102 includes inductors L3' and L4' and capacitors C2', C3', and C4'.

The capacitor C1' and the inductors L1' and L2' filter differential-mode noise over the live wire L and the neutral wire N. The capacitors C2' and the inductors L3' and L4' filter common-mode noise over the live wire L and the neutral wire N. The capacitor C3' and the inductor L3' filter common-mode noise over the live wire L and the ground wire G. The capacitor C4' and the inductor L4' filter common-mode noise over the neutral wire N and the ground wire G.

In the filter 10, the differential-mode filtering circuit 101 and the common-mode filtering circuit 102 both use one capacitor and inductors for filtering. However, capacitors have different equivalent series inductance and different equivalent series resistance during using, which resulting in that capacitors for filtering low frequency noise cannot filter high frequency noise and capacitors for filtering high frequency noise cannot filter low frequency noise. Thus, the filter 10 cannot effectively filter noise with limited filtering bands.

DETAILED DESCRIPTION

Figure 1:
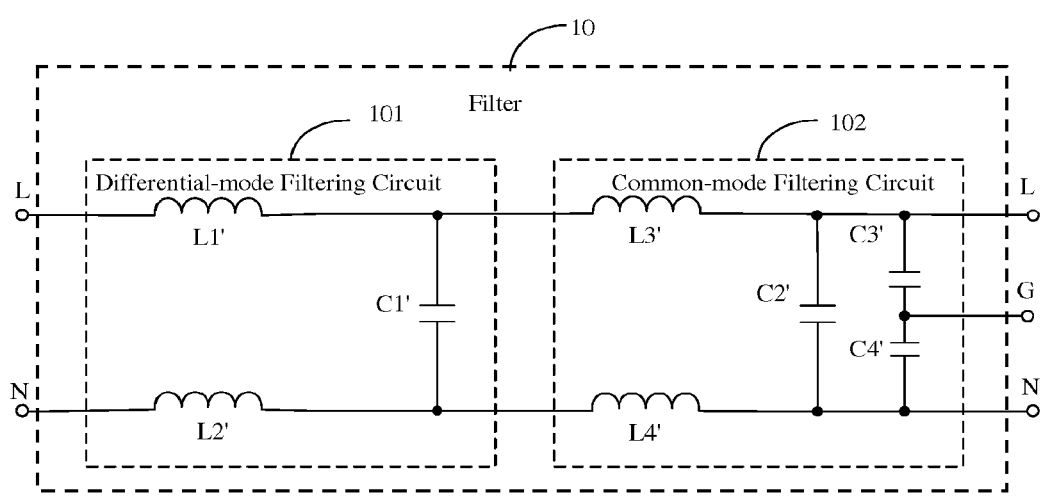
FIG. 1 is a circuit diagram of a prior art filter.
Figure 2:
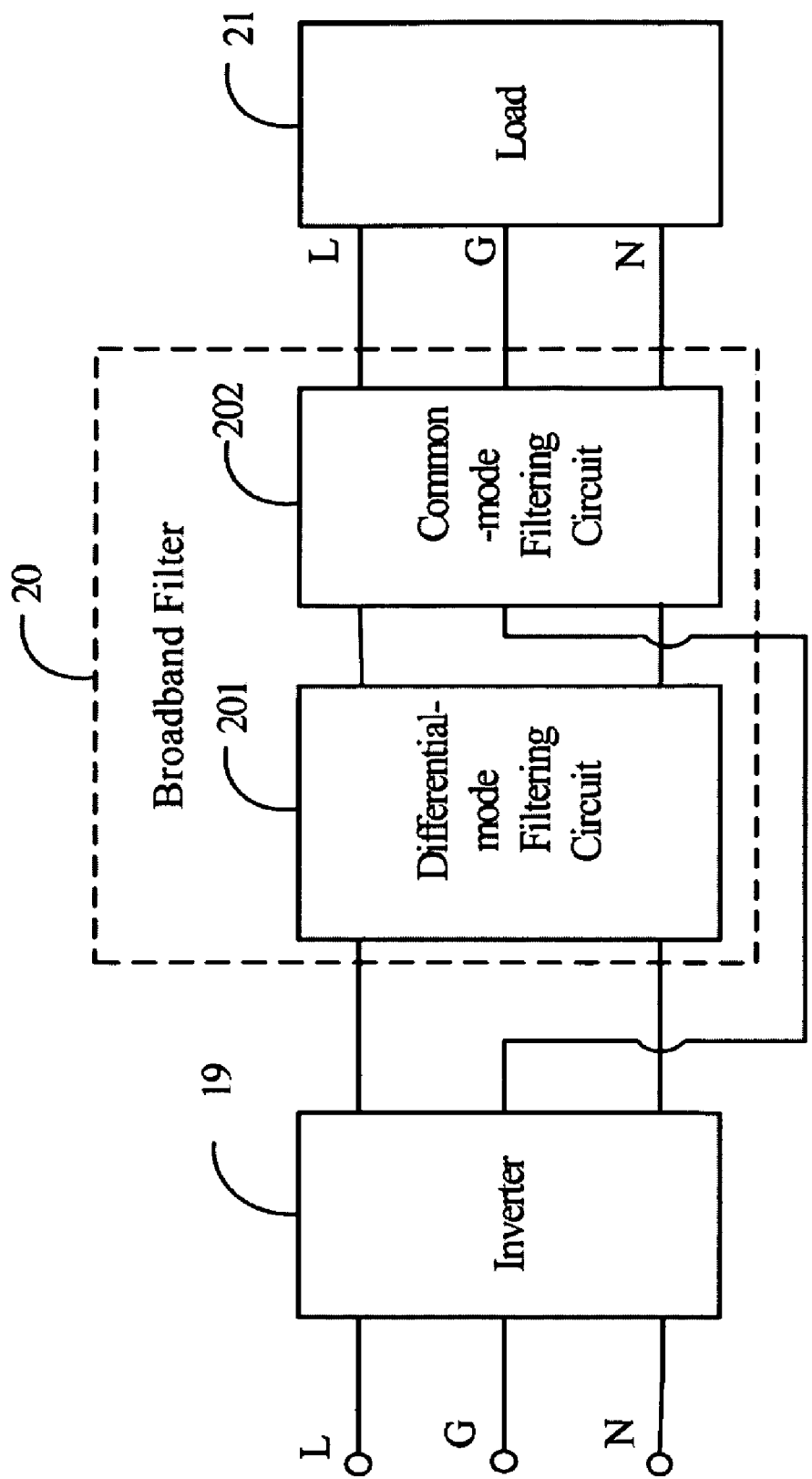
FIG. 2 is a schematic diagram of one embodiment of an application environment of a broadband filter as disclosed.

FIG. 2 is a schematic diagram of one embodiment of an application environment of the disclosed broadband filter 20. An inverter 19, the broadband filter 20, and a load 21 are connected in series through a first conductive wire, a second conductive wire, and a third conductive wire. The inverter 19 outputs signals with noise to the broadband filter 20 to filter the noise, and then the broadband filter 20 outputs the signals without noise to the load 21. The broadband filter 20 includes a differential-mode filtering circuit 201 and a common-mode filtering circuit 202. It is appreciated that the load 21 may be a manufacturing or testing device. The first, second, and third conductive wires are a live wire L, a neutral wire N, and a ground wire G, respectively.

The differential-mode filtering circuit 201 is structured and arranged to filter differential-mode noise. The common-mode filtering circuit 202 is structured and arranged to filter common-mode noise.

Figure 3:
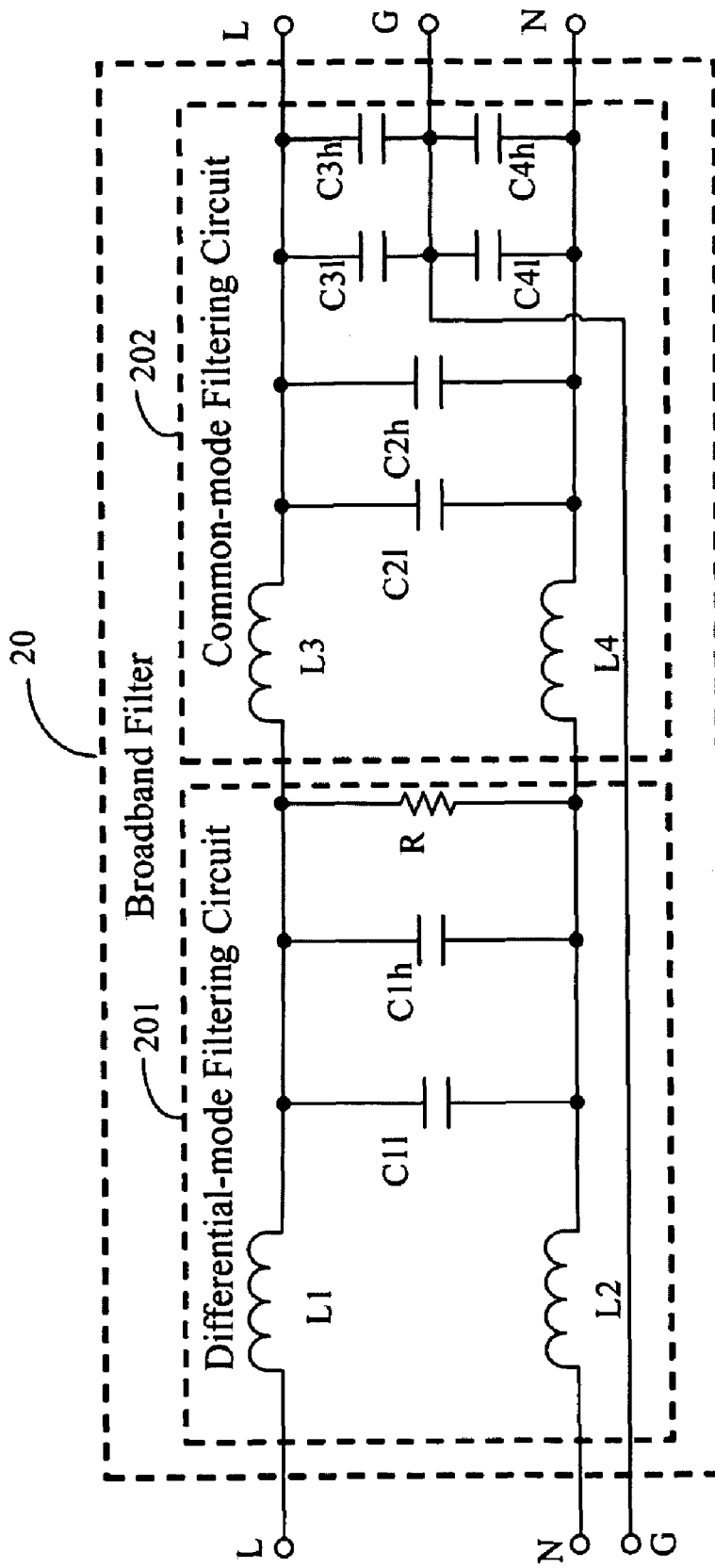
FIG. 3 is a circuit diagram of one embodiment of the broadband filter of FIG. 2.

FIG. 3 is a circuit diagram of one embodiment of the broadband filter 20 of FIG. 2. The differential-mode filtering circuit 201 is connected to both the live wire L and neutral wire N and includes a first inductor L1, a second inductor L2, a first capacitor C1$l$, a second capacitor C1$h$, and a resistor R. The first inductor L1 is embedded in the live wire L with one end being a first input of the differential-mode filtering circuit 201 and another end being a first output of the differential-mode filtering circuit 201. The second inductor L2 is embedded in the neutral wire N with one end being a second input of the differential-mode filtering circuit 201 and another end being a second output of the differential-mode filtering circuit 201. The first capacitor C1$l$ is connected to the first output and the second output of the differential-mode filtering circuit 201. The second capacitor C1$h$ is in parallel with the first capacitor C1$l$.

The first capacitor C1, the first inductor L1, and the second inductor L2 filter low frequency differential-mode noise over the live wire L and the neutral wire N, and the second capacitor C1$h$, the first inductor L1, and the second inductor L2 filter high frequency differential-mode noise over the live wire L and the neutral wire N. In one embodiment, the first capacitor C1$l$ is µF-class capacitor and the second capacitor C1$h$ is pF-class or nF-class capacitor, the low frequency may be below 10 MHz, and the high frequency may be above 10 MHz, and especially frequencies above GHz. The resistor R is connected between the live wire L and the neutral wire N for limiting noise current therethrough.

The common-mode filtering circuit 202 is connected to the live wire L, the neutral wire N and the ground wire G and includes a third inductor L3, a fourth inductor L4, a third capacitor C2$l$, a fourth capacitor C2$h$, a fifth capacitor C3$l$, a sixth capacitor C3$h$, a seventh capacitor C4$l$, and an eighth capacitor C4$h$. The third inductor L3 is embedded in the live wire L with one end being a first input of the common-mode filtering circuit 202 and connected to the first output of the differential-mode filtering circuit 201, and another end being a first output of the common-mode filtering circuit 202. The fourth inductor L4 is embedded in the neutral wire N with one end being a second input of the common-mode filtering circuit 202 and connected to the second output of the differential-mode filtering circuit 201, and another end being a second output of the common-mode filtering circuit 202. The third capacitor C2$l$ is connected between the first output and the second output of the common-mode filtering circuit 202. The fourth capacitor C2$h$ is in parallel with the third capacitor C2$l$. The fifth capacitor C3$l$ is connected between the first output of the common-mode filtering circuit 202 and the ground wire G. The sixth capacitor C3$h$ is in parallel with the fifth capacitor C3$l$. The seventh capacitor C4$l$ is connected between the second output of the common-mode filtering circuit 202 and the ground wire G. The eighth capacitor C4$h$ is in parallel with the seventh capacitor C4$l$.

In this embodiment, the third capacitor C2$l$, the third inductor L3, and the fourth inductor L4 filter low frequency common-mode noise over the live wire L and the neutral wire N. The fourth capacitor C2$h$, the third inductor L3, and the fourth inductor L4 filter high frequency common-mode noise over the live wire L and the neutral wire N. The fifth capacitor C3$l$ and the third inductor L3 filter low frequency common-mode noise over the live wire L and the ground wire G. The sixth capacitor C3h and the third inductor L3 filter high frequency common-mode noise over the live wire L and the ground wire G. The seventh capacitor C4l and the fourth inductor L4 filter low frequency common-mode noise over the neutral wire N and the ground wire G. The eighth capacitor C4h and the fourth inductor L4 filter high frequency common-mode noise over the neutral wire N and the ground wire G. In one embodiment, the third capacitor C2l, the fifth capacitor C3l, and the seventh capacitor C4l are µF-class capacitors, and the fourth capacitor C2h, the sixth capacitor C3h, and the eighth capacitor C4h are pF-class or nF-class capacitors.

The broadband filter 20 uses a capacitor and corresponding inductors for filtering low frequency noise and another capacitor and corresponding inductors for filtering high frequency noise, thus, the broadband filter 20 can effectively filter noise and increase filtering bands, which decreases interferences of noise.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A broadband filter, configured for filtering noise over a first conductive wire, a second conductive wire, and a third conductive wire, comprising:
   a differential-mode filtering circuit connected to both the first conductive wire and the second conductive wire, comprising:
   a first inductor connected to the first conductive wire with one end being a first input of the differential-mode filtering circuit and another end being a first output of the differential-mode filtering circuit;
   a second inductor connected to in the second conductive wire with one end being a second input of the differential-mode filtering circuit and another end being a second output of the differential-mode filtering circuit;
   a first capacitor connected between the first output and the second output of the differential-mode filtering circuit; and
   a second capacitor in parallel with the first capacitor; and
   a common-mode filtering circuit connected to the first conductive wire and the second conductive wire and connected to the first output and the second output of the differential-mode filtering circuit, comprising:
   a third inductor connected to in the first conductive wire with one end being a first input of the common-mode filtering circuit and connected to the first output of the differential-mode filtering circuit, and another end being a first output of the common-mode filtering circuit;
   a fourth inductor connected to in the second conductive wire with one end being a second input of the common-mode filtering circuit and connected to the second output of the differential-mode filtering circuit, and another ending being a second output of the common-mode filtering circuit;
   a third capacitor connected between the first output and the second output of the common-mode filtering circuit;
   a fourth capacitor in parallel with the third capacitor;
   a fifth capacitor connected between the first output of the common-mode filtering circuit and the third conductive wire;
   a sixth capacitor in parallel with the fifth capacitor;
   a seventh capacitor connected between the second output of the common-mode filtering circuit and the third conductive wire; and
   an eighth capacitor in parallel with the seventh capacitor.

2. The broadband filter of claim 1, wherein the first conductive wire is a live wire, the second conductive wire is a neutral wire, and the third conductive wire is a ground wire.

3. The broadband filter of claim 1, wherein the first capacitor, the first inductor, and the second inductor filter low frequency differential-mode noise over the first conductive wire and the second conductive wire, and wherein the second capacitor, the first inductor, and the second inductor filter high frequency differential-mode noise over the first conductive wire and the second conductive wire.

4. The broadband filter of claim 1, wherein the third capacitor, the third inductor, and the fourth inductor filter low frequency common-mode noise over the first conductive wire and the second conductive wire, and wherein the fourth capacitor, the third inductor, and the fourth inductor filter high frequency common-mode noise over the first conductive wire and the second conductive wire.

5. The broadband filter of claim 4, wherein the fifth capacitor and the third inductor filter low frequency common-mode noise over the first conductive wire and the third conductive wire, and wherein the sixth capacitor and the third inductor filter high frequency common-mode noise over the first conductive wire and the third conductive wire.

6. The broadband filter of claim 5, wherein the seventh capacitor and the fourth inductor filter low frequency common-mode noise over the second conductive wire and the third conductive wire, and wherein the eighth capacitor and the fourth inductor filter high frequency common-mode noise over the second conductive wire and the third conductive wire.

7. The broadband filter of claim 1, wherein the differential-mode filtering circuit further comprises a resistor connected between the first conductive wire and the second conductive wire for limiting noise current through the first conductive wire and the second conductive wire.

8. A broadband filter for filtering noise over a first conductive wire, a second conductive wire, and a third conductive wire, comprising:
   a differential-mode filtering circuit connected to both the first conductive wire and the second conductive wire, comprising:
   a first inductor connected to the first conductive wire with one end being a first input of the differential-mode filtering circuit and another end being a first output of the differential-mode filtering circuit;
   a second inductor connected to the second conductive wire with one end being a second input of the differential-mode filtering circuit and another end being a second output of the differential-mode filtering circuit; and
   a first capacitor set comprising at least two capacitors connected between the first output and the second output of the differential-mode filtering circuit in parallel, one of the at least two capacitors configured for filtering high frequency noise and another one of the at least two capacitors configured for filtering low frequency noise; and
   a common-mode filtering circuit connected to the first conductive wire and the second conductive wire and connected to the first output and the second output of the differential-mode filtering circuit, comprising:
   a third inductor connected to the first conductive wire with one end being a first input of the common-mode filtering circuit and connected to the first output of the differential-mode filtering circuit, and another end being a first output of the common-mode filtering circuit;

a fourth inductor connected to the second conductive wire with one end being a second input of the common-mode filtering circuit and connected to the second output of the differential-mode filtering circuit, and another ending being a second output of the common-mode filtering circuit;

a second capacitor set comprising at least two capacitors connected between the first output and the second output of the common-mode filtering circuit in parallel, one of the at least two capacitors of the second capacitor set configured for filtering high frequency noise and another one of the at least two capacitors of the second capacitor set configured for filtering low frequency noise;

a third capacitor set comprising at least two capacitors connected between the first output of the common-mode filtering circuit and the third conductive wire in parallel, one of the at least two capacitors of the third capacitor set configured for filtering high frequency noise and another one of the at least two capacitors of the third capacitor set configured for filtering low frequency noise; and a fourth capacitor set comprising at least two capacitors connected between the second output of the common-mode filtering circuit and the third conductive wire in parallel, one of the at least two capacitors of the fourth capacitor set configured for filtering high frequency noise and another one of the at least two capacitors of the fourth capacitor set configured for filtering low frequency noise.

* * * * *